United States Patent [19]
Podd

[11] Patent Number: 5,890,611
[45] Date of Patent: Apr. 6, 1999

[54] APPARATUS FOR DISCHARGING A CONTAINER LINER WITH DUAL PORTS

[76] Inventor: Stephen D. Podd, 1321 Sherbrooke Street West, Apt. E1, Montreal, Quebec, Canada, H3G-1J4

[21] Appl. No.: 785,755

[22] Filed: Jan. 18, 1997

[51] Int. Cl.$^6$ ................................................. B65D 25/00
[52] U.S. Cl. ................................... 220/1.5; 220/495.01
[58] Field of Search ............................ 220/1.5, 495.01; 222/535

[56] References Cited

U.S. PATENT DOCUMENTS

| | | | |
|---|---|---|---|
| 3,868,042 | 2/1975 | Bodenheimer | 220/1.5 X |
| 5,181,625 | 1/1993 | Podd, Sr. et al. | 220/1.5 |
| 5,487,485 | 1/1996 | Yang et al. | 220/1.5 X |
| 5,692,546 | 12/1997 | Podd, Sr. et al. | 220/495.01 X |

Primary Examiner—Steven Pollard
Attorney, Agent, or Firm—John C. Smith

[57] ABSTRACT

A multiple door bulkhead which can be partially opened to accommodate a small discharge or completely opened to accommodate a wide discharge port. In addition, a single standard liner provides multiple discharge ports which can be selectively opened at the user's discretion. Alternative embodiments provide a single standard liner to which multiple liner discharge can be attached. A discharge port is also shown which can be attached directly to the bulkhead. Optional quick attachment methods are provided in which reusable discharge ports can be attached to the standard liner or the multiple door bulkhead. The end of the liner is opened for unloading by cutting the section of the end wall which is encircled by the desired port. The liner and ports are optionally provided in kit form with pre-attached tape on the liner and ports. The ports do not have to be attached to the liner until required.

5 Claims, 12 Drawing Sheets

APPARATUS FOR DISCHARGING A CONTAINER LINER WITH DUAL PORTS

BACKGROUND OF THE INVENTION

1. Technical Field

The present invention relates to the loading and unloading of flowable cargo transported in lined bulk cargo containers. In particular, it relates to a method and apparatus for using a multiple door bulkhead for installing multiple discharge ports of varying sizes on a standard container liner or on the container liner bulkhead such that a standard container liner can be used for a variety of cargo types.

2. Background Art

Transportation of containers for bulk commodity products (grains, etc) have been implemented using a variety transport vehicles, such as trucks, railroads, and ships. Depending on the nature of the cargo, liners may have to be installed to protect the cargo from contamination (in the case of foods or other perishables) and/or prevent leakage (in the case of powders, small particles, etc.).

An important economic factor in the transportation of bulk commodities is the speed and ease with which the commodities are loaded and unloaded from the container. One factor which effects the speed, and consequently the cost, of loading and unloading containers used for the transport of bulk commodities is the time and expense required to unload the liners due to the type of discharge port used.

The prior art has developed several methods of discharging container liners. One method is the use of narrow tubular discharge ports attached to the rear of the liner. Alternatively, liners have been used which have wide discharge port extending across substantially the width of the liner. This method provides flexibility in terms of preparing a liner for a particular cargo type, but it also has several drawbacks. In particular, the liners are typically made as separate liner types, requiring inventory tracking for each type used. Likewise, it requires additional components, in the form of the bulkheads which are designed for each liner type. The requirement for multiple bulkhead types and liner types increases the total cost of the liners and the bulkheads, thus increasing the cost of discharging the liner.

Typical prior art methods of attaching discharge ports to liners use heat sealing techniques to secure the discharge port to the liner wall. This is usually done at the manufacturing site, and as a result, the user cannot select type discharge port type as needed for a particular cargo type. The inability to select discharge ports for use with a given liner creates another disadvantage for the user. In particular, since many users ship a variety of cargo types, they are then required to store a number of liner types which in turn increases their inventory and storage costs.

In addition to the construction of the liner itself, there is also the issue of the bulkhead type required to support a given liner type. Typical prior art approaches use disposable bulkheads which are designed to work with a liner that has a discharge port in a specific location. Of course, the same drawbacks associated with inventorying and storing multiple liner types applies equally as well to inventorying and storing multiple bulkhead types. Reusable bulkheads, for example those constructed from metal, have the same problem as the disposable bulkheads discussed above. Namely, their structure prevents them from being flexibly used with a variety of liner types, requiring the to be replaced depending on the particular liner used. A shipper who routinely changes cargo liner types will then have to replace the bulkhead and store it for later reuse.

While addressing various aspects of constructing liners and their associated load, vent, and discharge ports, the prior art has typically provided custom solutions which are directed to a particular liner configuration. As a result, users have increased manufacturing costs, increased storage costs, and increased inventory costs. The prior art has not provided a method of constructing a single standard liner and bulkhead system which allows the user to arbitrarily select the discharge port type most suitable for use with a particular cargo type.

SUMMARY OF THE INVENTION

The present invention solves the foregoing problems by providing a multiple door bulkhead which can be partially opened to accommodate a small discharge port or completely opened to accommodate a wide discharge port. In addition, a single standard liner provides multiple discharge ports which can be selectively opened at the user's discretion. Alternative embodiments provide a single standard liner to which multiple liner discharge ports can be attached. Another alternative embodiment provides a discharge port which can be attached directly to the bulkhead. Optional quick attachment methods are provided in which reusable discharge ports can be attached to the standard liner or the multiple door bulkhead via double stick tape.

DESCRIPTION OF THE PREFERRED EMBODIMENT

Figure 1:
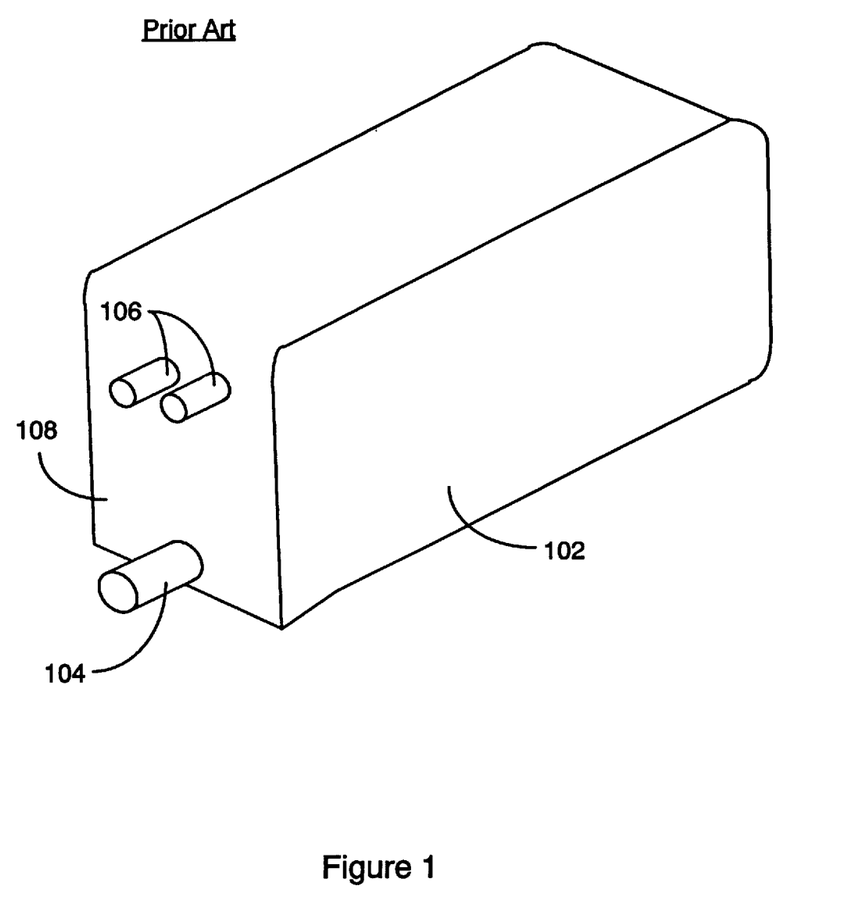
FIG. 1 is a diagram of a prior art liner with a small discharge port.

Referring to FIG. 1, this figure shows a prior art liner 102. Load/vent tubes 106 form a conduit to access load/vent liner 102. Discharge tube 104 is located to fit through discharge door 204 (shown in FIG. 2). It is also fabricated and attached in the same manner as load/vent tubes 106. Liner 102 is usually formed from a tube of liner material, typically polypropylene or polyethylene and sealed via heat seals. Load, vent, and discharge tubes 104, 106 are generally fabricated from liner material via heat sealing and attached to the end wall of liner 102, also via heat sealing.

Figure 2:
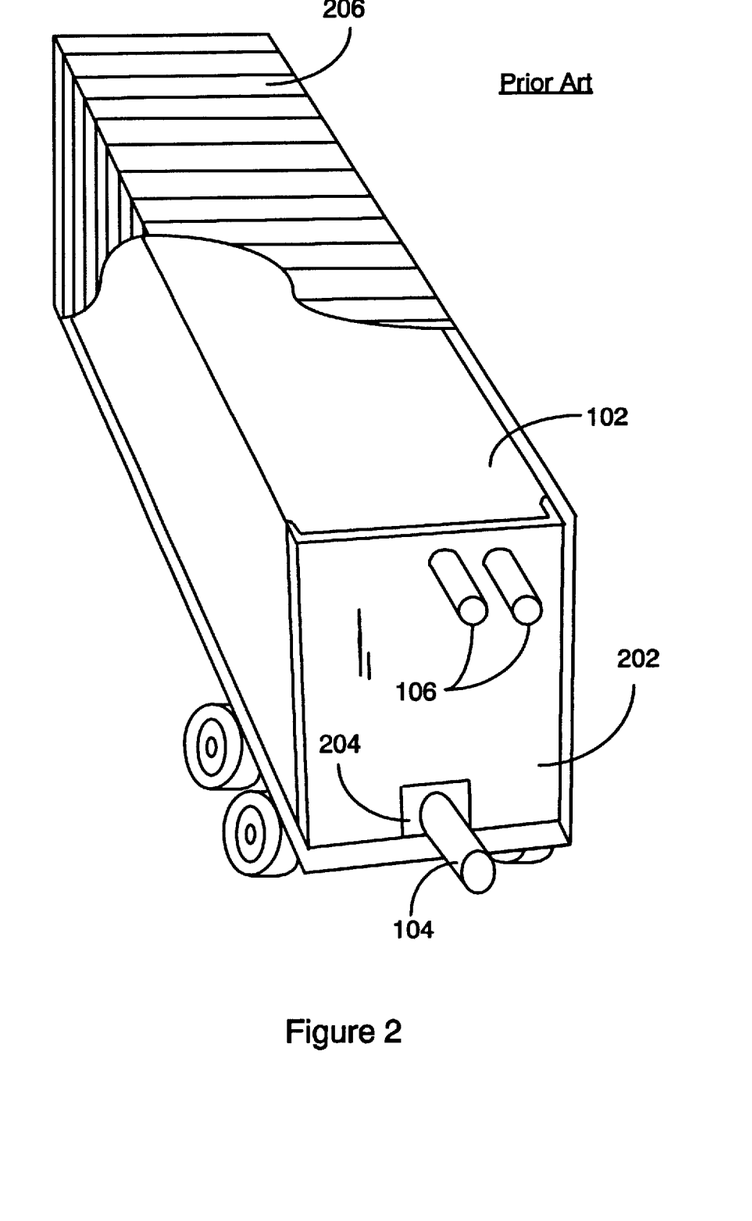
FIG. 2 is a diagram of a prior art liner with a small discharge port installed in a container with a bulkhead designed for that liner type.

FIG. 2 shows a cutaway view of a prior art container 206 which has liner 102 installed. Bulkhead 202 has discharge door 204 located at its base to allow discharge of cargo from container 206 via discharge tube 104. Load/vent ports 106 project through apertures in bulkhead 202 the top of liner 102 to provide access for loading the cargo. This type of small diameter discharge port is used for particular types of cargo. For ease of discussion, it will be referred to herein as a "small" discharge port.

Figure 3:
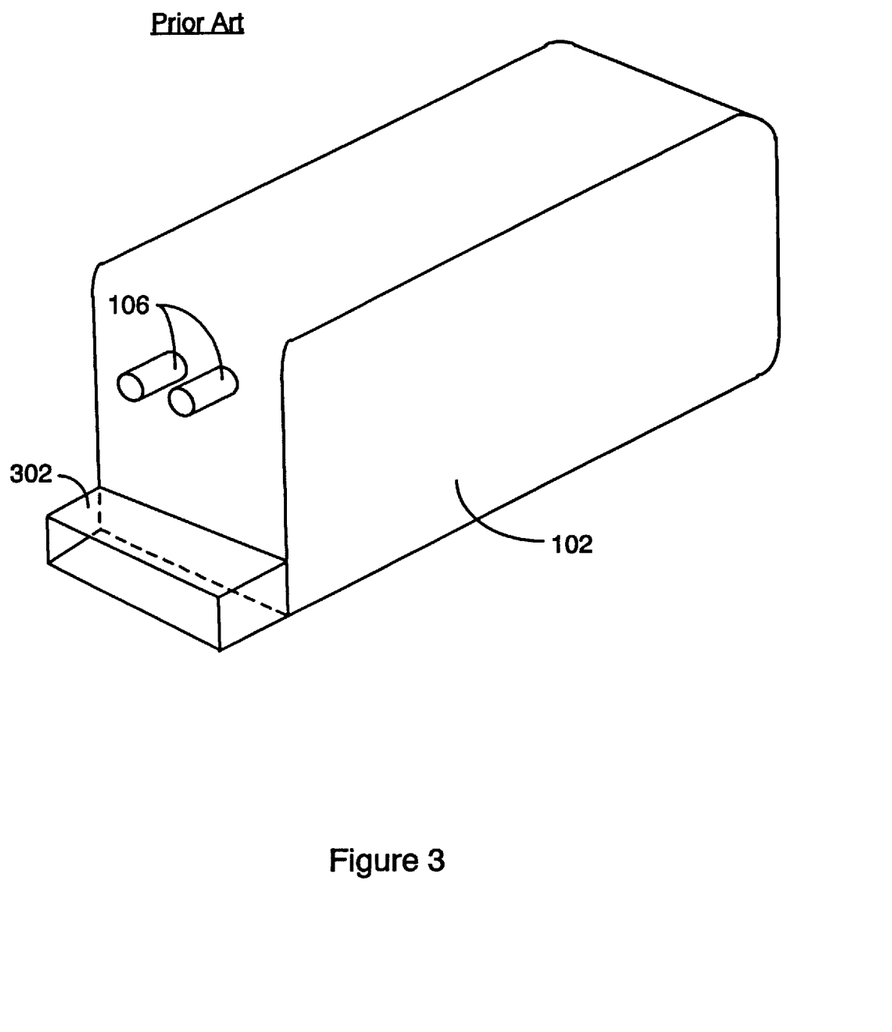
FIG. 3 is a diagram of a prior art liner with a wide discharge port.

FIG. 3 illustrates another method of fabricating liner 102. The discharge port used in this liner type is a "wide" discharge port 302. It is used for cargo types which are conducive to quickly discharging large quantities of cargo. While the small discharge port 104 would typically have a diameter approximately two feet wide, the width of the wide discharge port 302 may be substantially the width of the liner 102.

Figure 4:
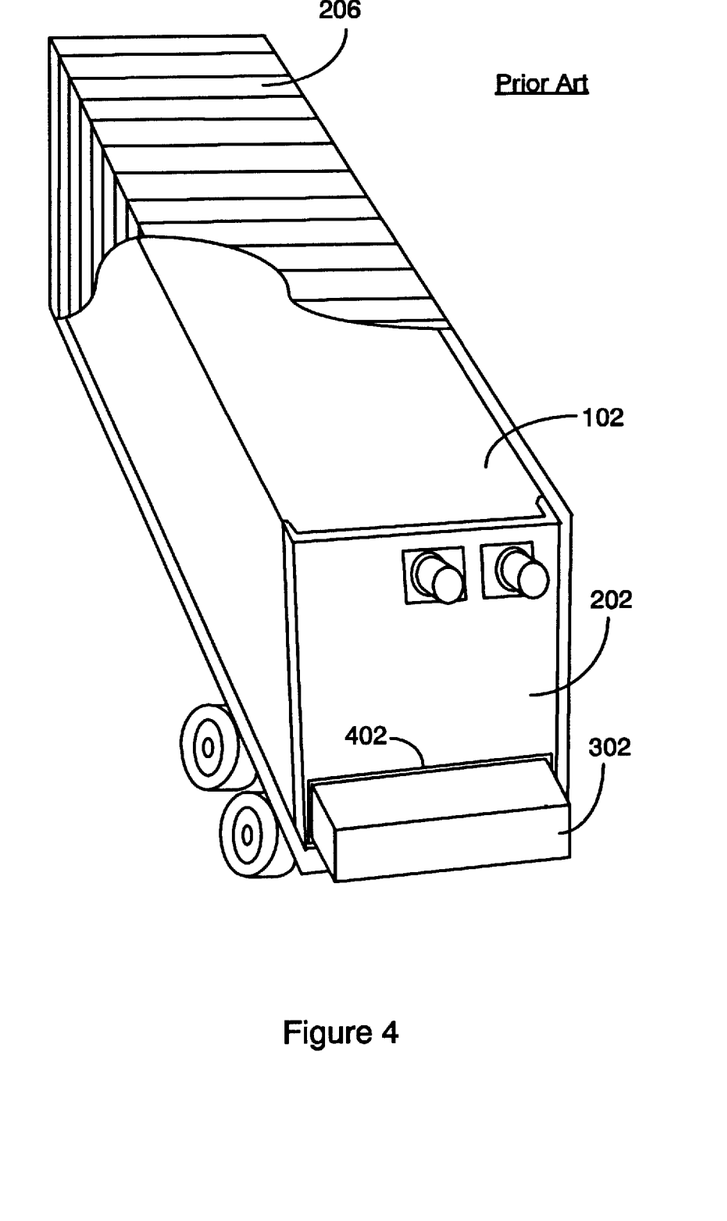
FIG. 4 is a diagram of a prior art liner with a wide discharge port installed in a container with a bulkhead designed for that liner type.

FIG. 4 shows a cutaway view of a prior art container 206 which has liner 102 installed. Bulkhead 202 has discharge door 204 located at its base to allow discharge of cargo from container 206 via discharge tube 104. This type of bulkhead uses a wider discharge door 204 to accommodate the wide discharge port 302. Load/vent ports 106 project through apertures in bulkhead 202 the top of liner 102 to provide access for loading the cargo.

Disadvantages associated with the prior art are caused by the extra expense of using two different types of liner discharge ports to accommodate varying cargo types. Likewise, the use of two separate types of bulkheads, each suitable for use on a particular liner type, also adds to the cost and inconvenience of prior art systems.

Figure 5:
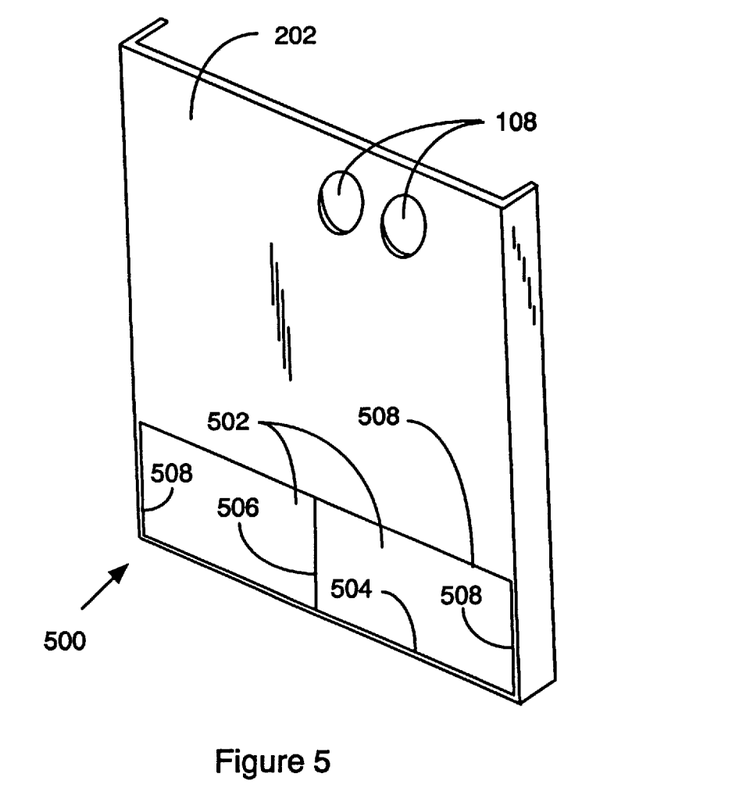
FIG. 5 is a diagram showing a preferred embodiment of the multiple door bulkhead used in the present invention.

FIG. 5 illustrates a preferred embodiment of a multiple door bulkhead 500 provided by the invention. The multiple door bulkhead 500 has discharge doors 502 which can be independently opened to suit a particular type of liner discharge port. Those skilled in the art will recognize that multiple door bulkhead 500 can be prefabricated from a variety of materials, so long as they are strong enough to withstand the weights expected in a cargo shipping environment. For example, a reusable wood or metal bulkhead can be used or a disposable bulkhead made from cardboard can also be used. The preferred embodiment envisions a disposable bulkhead fabricated from cardboard.

Discharge doors 502 are attached to multiple door bulkhead 500 at fold line 504, and separated from one another at cut line 506. When the discharge doors are to be opened, multiple door bulkhead 500 is cut along cut line 506 and the appropriate sections of edge cut lines 508. The advantage provided by the multiple door bulkhead 500 is that a single inventory item can be used for any type of liner discharge system. As a result, inventory costs are reduced, and the discharge operation is more convenient for the user.

Figure 6:
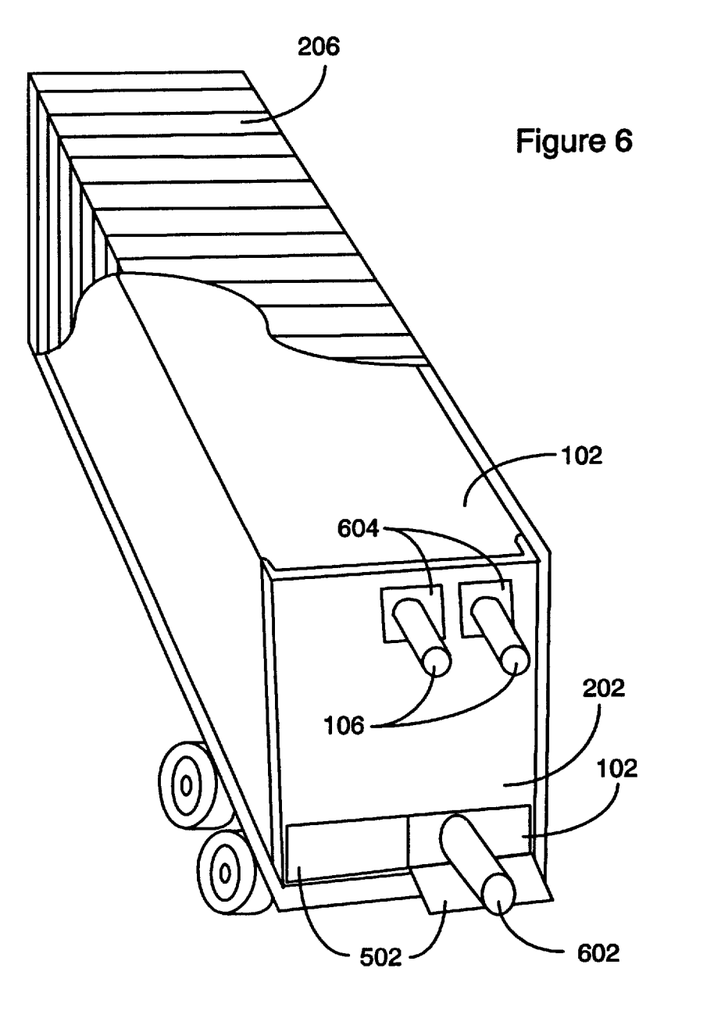
FIG. 6 is a rear perspective view of a preferred embodiment of the multiple door bulkhead used in the present invention with a small discharge port extended through the right side door of the multiple door bulkhead.

FIG. 6 is a perspective view of multiple door bulkhead 500 installed on a liner 102 with a small discharge port 602. In this embodiment, small discharge port 602 is offset to the right side of liner 102. Therefore, only the right discharge door 502 needs to be opened. This allows the left rear door (not shown) of container 206 to remain sealed, thereby increasing the stability of the multiple door bulkhead 500.

Figure 7:
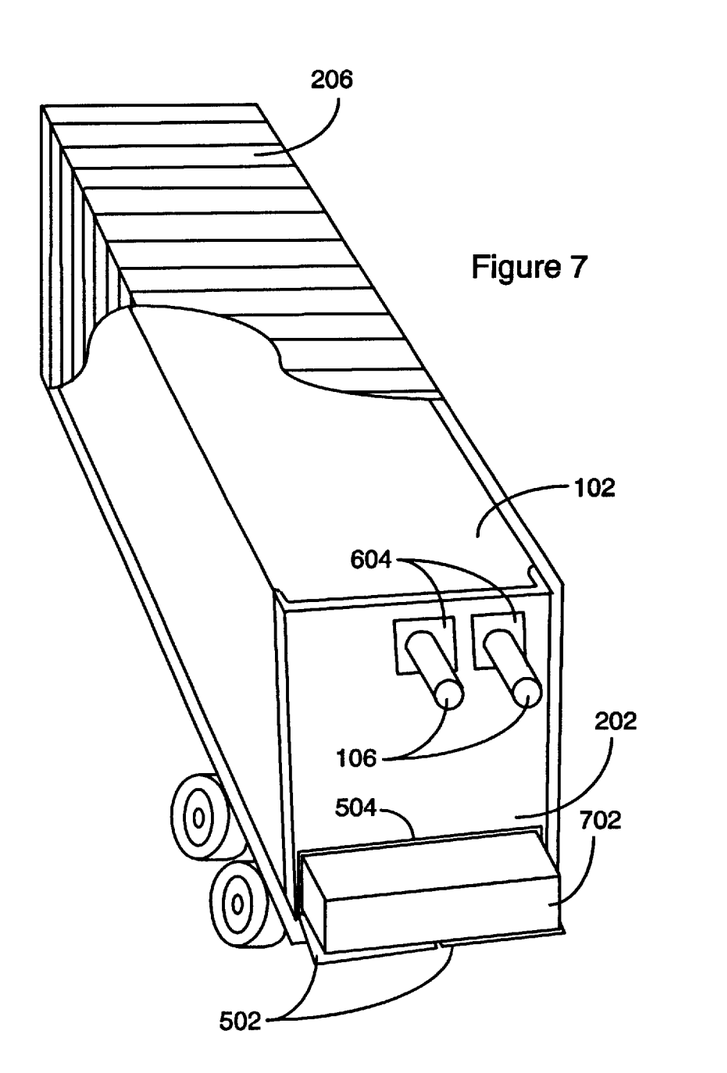
FIG. 7 is a rear perspective view of a preferred embodiment of the multiple door bulkhead used in the present invention with a wide discharge port extended through the both doors of the multiple door bulkhead.

FIG. 7 is a perspective view of multiple door bulkhead 500 installed on a liner 102 with a wide discharge port 702. In this embodiment, both discharge doors 502 must be opened to accommodate the width of wide discharge port 702. As can be seen, the same multiple door bulkhead 500 can be used with any type of liner, regardless of the type of discharge port used.

Figure 8:
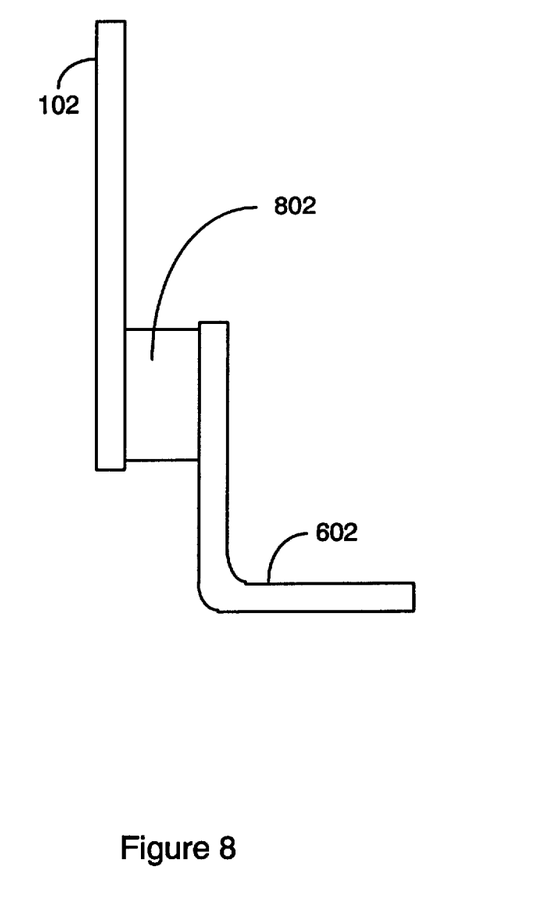
FIG. 8 is a diagram of a side view of a tape seal holding the liner wall to the discharge port.

FIG. 8 shows a side view of liner 102. In this view, double stick tape 802 is shown. Double stick tape 802 is pressed against the wall of liner 102 to form a seal and to hold port 602 in place against the wall of liner 102. This allows discharge ports 602 to be prefabricated and quickly installed on the wall a single standard liner 102. Once installed, the wall of liner 102 surrounded by the discharge port can be cross cut or opened in any suitable fashion for unloading the cargo. Those skilled in the art will recognize that a wide discharge port 702 can also be installed in this manner.

Figure 9A:
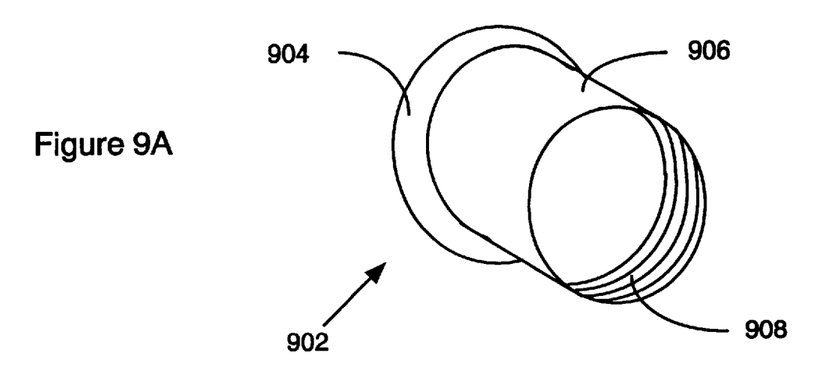
FIG. 9 is a diagram of a prefabricated load, vent or discharge port with tape seal attached.
Figure 9B:
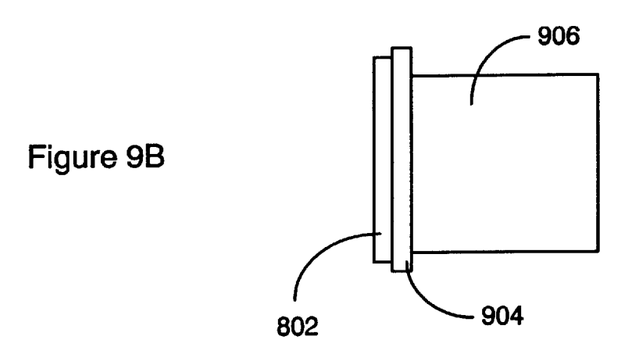
Figure 9C:
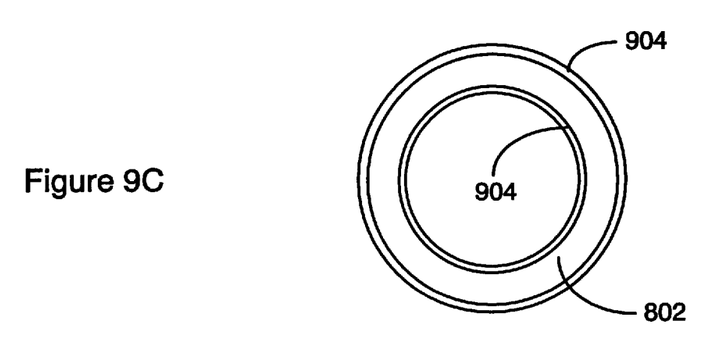

FIGS. 9A–C show a prefabricated small discharge port 902 which can be used for loading, venting, or discharge of liner 102. FIG. 9A is a perspective view, FIG. 9B is a side view illustrating the double stick tape 802 used to seal flange 904 against the surface of a liner. In the preferred embodiment, a flange 904 is extends from small discharge port 902 to provide an area for attaching double stick tape or other suitable adhesive for attachment of the small discharge port 902 to the wall of liner 102. Flange 904 joins conduit 906 which forms the body of port 902. Optional threads 908 are shown to illustrate a method of attaching a tube or other conduit to port 902 such that cargo may be unloaded via suction or pumping means (not shown). Those skilled in the art will recognize that any number of alternative methods may be used to attach a load, vent or discharge tube to port 902. Likewise, while port 902 is illustrated as a tubular structure, it can also be implemented in any convenient shape. Those skilled in the art will recognize that wide discharge port 702 can also be implemented in this manner, allowing that type of discharge port to be quickly secured to the side of a liner wall. Likewise, the small discharge port 602 and the wide discharge port 702 can also be prefabricated with liner 102 and made from the same material.

FIG. 9C shows an end view of port 902. In the preferred embodiment, the double stick tape 802 is precut and attached to flange 904 in such a manner that as much area as possible is available to form a seal with liner 102. Also, while the tape can be cut and installed on flange 904 during installation of port 902 on double stick tape 802 which is prefabricated onto port 902. In addition, the preferred embodiment envisions a peelable cover (not shown) attached to the outer surface of double stick tape 802. Those skilled in the art will recognize that any number of commercially available peelable cover materials can be used. By prefabricating port 902 with double stick tape 802, port 902 can be easily installed against the wall of liner 102 by peeling the cover and pressing port 902 against the wall of liner 102.

In addition, by providing the ability to attach the ports 902 to the wall of liner 102 as described, the wall of liner 102 does not have to be penetrated until the point of delivery. Delaying penetration of the wall of liner 102 in turn reduces the possibility of leakage. Those skilled in the art will recognize that while port 902 was shown as a rigid unit for ease of illustration, it could just as easily be constructed from any suitable flexible material, and take any convenient shape.

Figure 10:
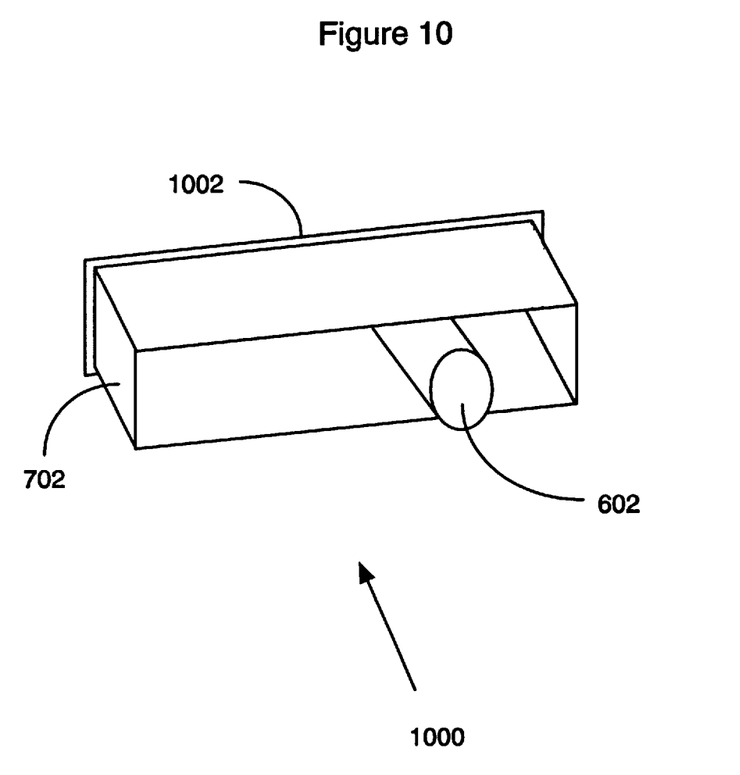
FIG. 10 is a perspective view of a load, vent, or discharge port which has been prefabricated with both ports sizes available, one within another.

FIG. 10 illustrates an alternative embodiment of the invention which uses a combination discharge port with multiple discharge port sizes. In this embodiment, small discharge port 602 is attached to port retaining wall surface 1002. Likewise, wide discharge port 702 is also attached to port retaining wall surface 1002 such small discharge port 602 and wide discharge port 702 are aligned relative to one another in the same manner they would be if positioned for use with doors 502. Port retaining wall surface 1002 is shown as a separate layer of material suitable for attachment to the wall of liner 102. Likewise, port retaining wall surface 1002 can be eliminated 10 and the surface of liner 102 can perform its function.

This embodiment allows a liner to be fabricated or modified such that both types of ports are available for use on the same liner. If the small discharge port 602 is desired, then the surface of liner wall 102 is cut in the same manner as it would be as described in FIG. 6, above. On the other hand, if wide discharge port 702 is desired, then it would be cut as described in regard to FIG. 7, above, and the material removed along with small discharge port 602. This structure allows a single discharge port structure 1000 to be used with any type of cargo, thereby reducing inventory requirements and cost. In the preferred embodiment, discharge port structure 1000 is fabricated from the same material as that used to fabricate liner 102.

Figure 11:
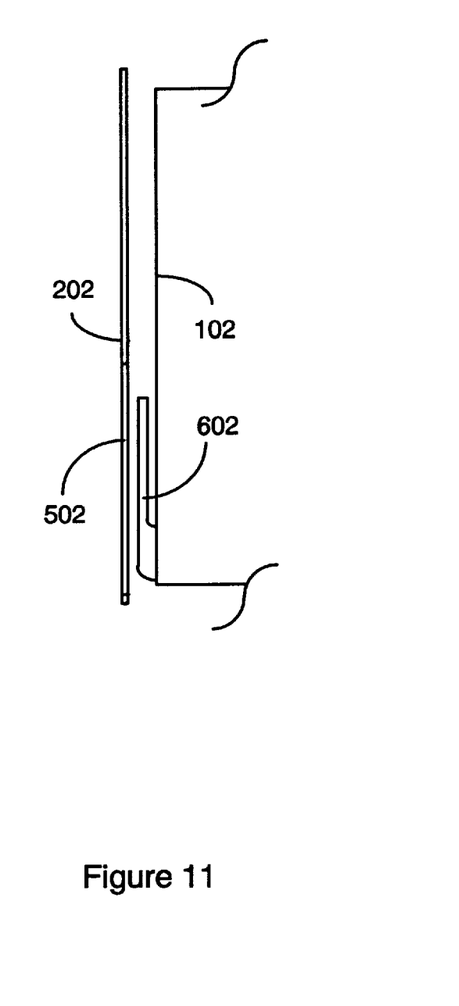
FIG. 11 is a side view of multiple door bulkhead installed on a liner with a port installed on the liner and compressed between the liner and the bulkhead.

FIG. 11 shows a side view of small discharge port 602 attached to the rear surface of liner 102 and held in place by bulkhead 202. Those skilled in the art will recognize that the wide discharge port 702 can also be attached and store during shipment in this manner. This embodiment allows the discharge ports to be attached prior to shipment or even during manufacture. When the cargo is to be unloaded, discharge door 502 (or doors if the wide discharge port 702 is used) is opened, the discharge port extended, and the liner 102 wall opened to release the cargo. This embodiment requires a minimum amount of work, and as discussed above in relation to FIG. 10, allows a single liner to be used with either discharge method.

Figure 12:
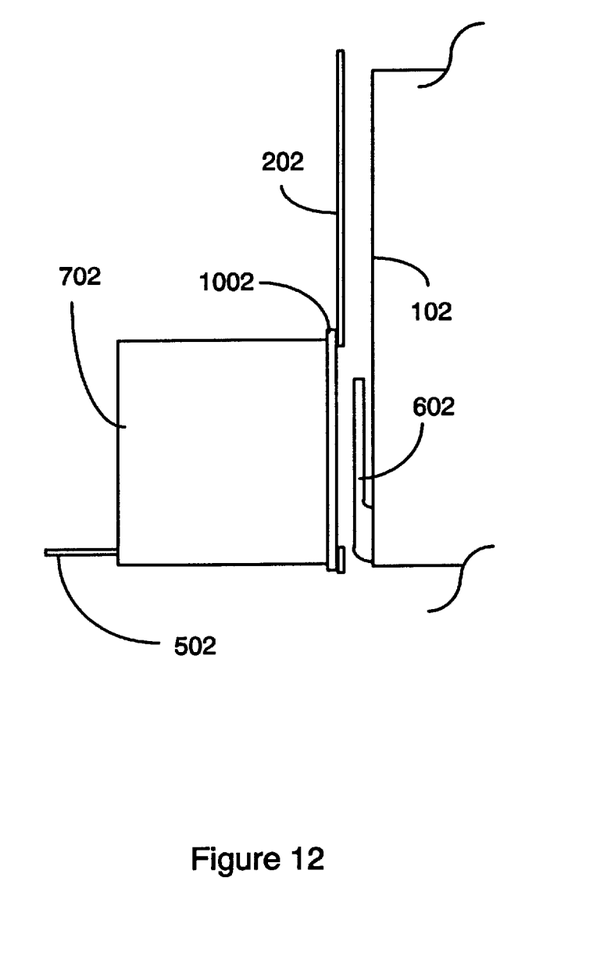
FIG. 12 is a side view of a wide discharge port which has been installed on the side of the bulkhead such that the multiple doors can be opened within the wide discharge port.

FIG. 12 is an alternative embodiment in which the a prefabricated wide discharge port 702 is attached to the surface of the bulkhead 202 rather than the liner. The wide discharge port used in this embodiment is sized to fit around the discharge doors 502 such that they can be opened within wide discharge port 702. Bulkhead 202 would normally be sealed to liner 102 by any suitable sealing means (such as the double stick tape discussed above) to prevent spillage of cargo during the unloading process. For ease of illustration, the double stick tape is not shown. Also shown is small discharge port 602 attached to liner 102. This embodiment allows a liner with a small discharge port to be used for either discharge method, and it also allows a liner with no discharge port to be unloaded.

Advantages provided by this invention include the ability to use a single standard liner style for any unloading operation, thereby reducing inventory, cost, and the time required to unload cargo. Alternate embodiment include disposable and reusable discharge ports. The multiple discharge doors 502 in the bulkhead 202 provide the user with this single liner advantage. Further the combination multiple discharge ports structure shown in FIG. 10, provides a single discharge port structure which can be selectably cut to create either a small discharge port 602 or a wide discharge port 702. Likewise, the discharge port shown in FIG. 12 allows the discharge port to be attached directly to the bulkhead, thus eliminating any requirement for attaching the discharge port directly to the liner 102.

While the invention has been described with respect to a preferred embodiment thereof, it will be understood by those skilled in the art that various changes in detail may be made therein without departing from the spirit, scope, and teaching of the invention. For example, the liner can be fabricated without ports or with both ports, it can be prefabricated from a variety of materials and for a variety of port sizes. Further, while two port sizes were shown for illustrative purposes, small ports of varying sizes can be put behind either or both discharge doors to provide the user with more unloading options. Ports can be fabricated from liner material or from rigid material, etc. Accordingly, the invention herein disclosed is to be limited only as specified in the following claims.

I claim:

1. A multiple discharge port system for a bulk container liner, comprising:

a liner having an exterior wall;

at least two discharge ports attached to the exterior wall of the liner, the discharge ports further comprising at least one small discharge port and at least one wide discharge port; and a bulkhead further comprising at least a first independently operable door and a second independently operable door, the first independently operable door laterally positioned from the second independently operable door such that when the first independently operable door is opened, at least one small discharge port is extendable through the first independently operable door wherein the second independently operable door, when opened, forms a contiguous single opening with the open the first open independently operable door, and at least one wide discharge port is extendable through the first and second independently operable doors.

2. A system as in claim 1, wherein the discharge ports are fabricated as part of the liner.

3. A system as in claim 1, wherein the discharge ports are fabricated independently of the liner.

4. A system, as in claim 1, wherein the discharge ports are fabricated together as a single discharge device, the discharge device fabricated such that the small discharge port is located inside the perimeter of the wide discharge port.

5. A system, as in claim 1, wherein the wide discharge port is attached to the bulkhead.

* * * * *